United States Patent [19]

Moody

[11] 4,441,316
[45] Apr. 10, 1984

[54] WAVE ENERGY DEVICE

[75] Inventor: George W. Moody, Glasgow, Scotland

[73] Assignee: The Secretary of State for Energy in Her Britannic Majesty's Government of the United Kingdom of Great Britain and Northern Ireland

[21] Appl. No.: 323,699

[22] Filed: Nov. 20, 1981

[30] Foreign Application Priority Data

Dec. 1, 1980 [GB] United Kingdom ............. 8038510

[51] Int. Cl.³ .............................................. F03B 13/12
[52] U.S. Cl. ...................................... 60/398; 60/497; 417/100
[58] Field of Search ............... 60/398, 495–507; 417/100

[56] References Cited

U.S. PATENT DOCUMENTS

| | | | |
|---|---|---|---|
| 2,484,183 | 10/1949 | Paulson | 60/398 |
| 3,925,986 | 12/1975 | Barwick | 60/398 |
| 4,098,081 | 7/1978 | Woodman | 60/398 |
| 4,383,413 | 5/1983 | Wells | 60/398 X |

FOREIGN PATENT DOCUMENTS 1522661 8/1978 United Kingdom .
1587344 4/1981 United Kingdom .

OTHER PUBLICATIONS

"Experiments with Point Absorbers in Regular Waves" by Budal et al., Presented at Symposium on Wave Energy Utilization, Gothenburg 1979.
"Wave Power Conversion by Point Absorbers" by Falnes and Budal, Published in Norwegian Maritime Research, No. 4/1978.
"Power Extraction from Ocean Surface Waves", by Brown, Jones and Guenther, published in Journal of Energy Resources Technology, Jun. 1979, vol. 101, pp. 141–144.

Primary Examiner—Allen M. Ostrager
Attorney, Agent, or Firm—William R. Hinds

[57] ABSTRACT

A device and a method for extracting energy from waves on a liquid from the oscillations of a column 14 of liquid in a chamber 22. The oscillations are caused by an oscillatory excitation force 'Fe' produced by the effect of the waves. The phase of the velocity 'z' of the column 14 of liquid and the phase of the excitation force 'Fe' are brought substantially into phase by arresting the motion of the column 14 of liquid, and holding the column 14 of liquid stationary until the column 14 of liquid can be released in phase with the excitation force 'Fe'.

18 Claims, 12 Drawing Figures

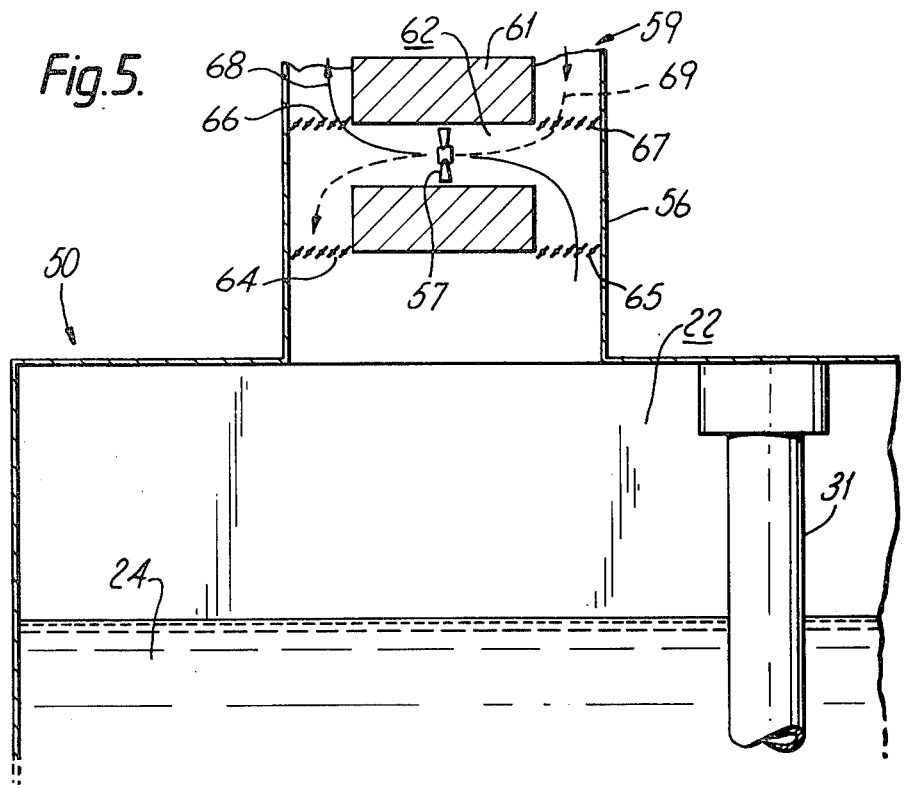
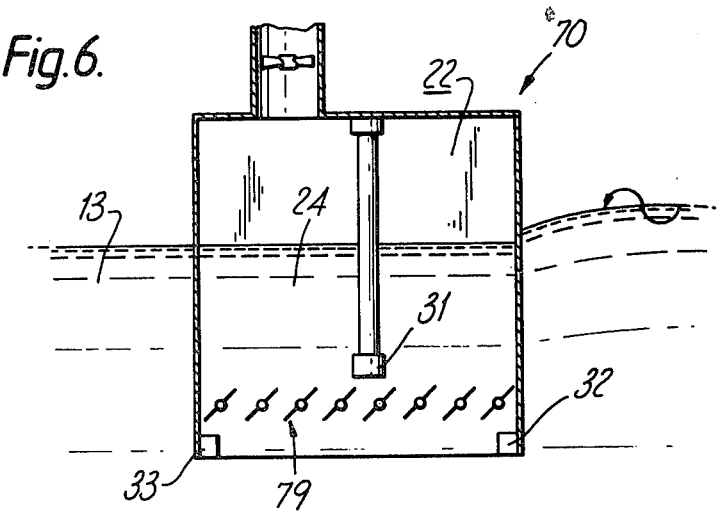

WAVE ENERGY DEVICE

This invention relates to a device for and a method of extracting energy from waves on a liquid, and in particular to a device in which a quantity of a liquid in a chamber of the device is caused to oscillate in the chamber to perform useful work under the effect of the waves on the device. An example of such a device is the buoy device invented by Yoshio Masuda and described in British patent specification No. 1,014,196. On the Masuda buoy device, the oscillation of a column of water in a chamber of the device causes a working gas in the chamber to flow through a turbine positioned above the chamber.

One problem common to many oscillating liquid wave energy devices is that of optimising the energy that can be extracted from the waves by the device.

The invention therefore in a first aspect provides a device for extracting energy from waves on a liquid, the device having a chamber with an opening for the flow of the liquid into and out of the chamber to provide a quantity of the liquid which is arranged to oscillate in the chamber from an oscillatory force produced by the effect of the waves, and means for extracting energy from said oscillations, there being provided means for determining the phase of said oscillatory force, means for determining the phase of the velocity of the oscillating liquid in the chamber, and means for shifting the phase of said velocity so that said velocity is substantially in phase with the phase of said oscillatory force.

The invention also in a second aspect, provides a method of extracting energy from waves on a liquid from the oscillations of a quantity of the liquid in a chamber under the effect of an oscillatory force produced by the effect of the waves, the method including sensing the phase of said force and of the velocity of said oscillations of the quantity of liquid, and shifting the phase of said velocity so that said velocity is substantially in phase with the phase of said force.

Preferably, said phase shifting is arranged by arresting the oscillations of the quantity of liquid at a null velocity of the oscillating movement thereof. Conveniently, the oscillations of the quantity of liquid may be arrested by obturator means which may be at or near the opening.

In some applications of the invention, the energy extracting means comprises pneumatic motor or turbine means through which a gas is caused to flow by the oscillations of the liquid, and the arresting means includes, means for obturating the flow of the gas. The gas obturator means may comprise rectifying valve means for producing uni-directional flow of the gas.

The energy extracting means may include a displacement member arranged to be displaced by the oscillations of the quantity of liquid, and the arresting means includes means for arresting the displacement of the displacement member.

The phase of the oscillatory force may be determined by means for sensing said force, or by means for sensing the vertical motion of the waves at a selected distance from the chamber. The phase of the velocity of the quantity of liquid may be determined by wave gauge means for monitoring the velocity of the liquid in the chamber, or by means for sensing the displacement of the displacement member.

The invention will now be further described by way of example only with reference to the accompanying drawings in which:

FIG. 4 shows graphically the velocity of the column of liquid with respect to the force producing the oscillations of the column in the devices of FIG. 2 or 2a;

FIG. 5 shows a fragmentary side, medial sectional view of a modification of the devices of FIG. 2 or 2a;

FIG. 6 shows a side, medial sectional view of a modification of the device of FIG. 2;

In the above Figures, like parts have like numerals.

Figure 1:
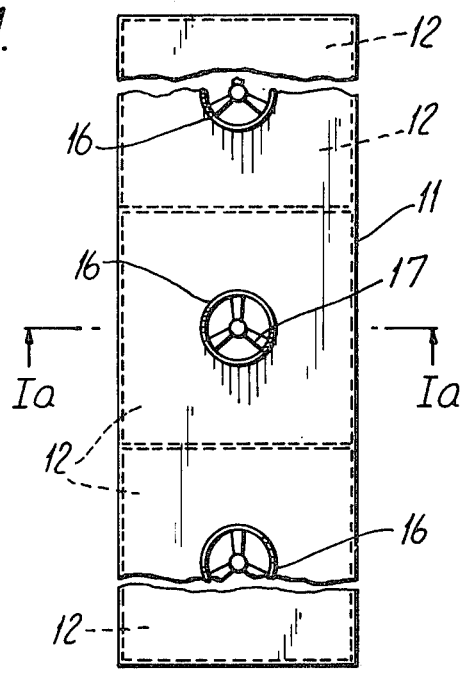
FIG. 1 shows a plan view of a diagrammatic representation of a known device for extracting energy from waves from the oscillations of a column of liquid in the device.
Figure 1A:
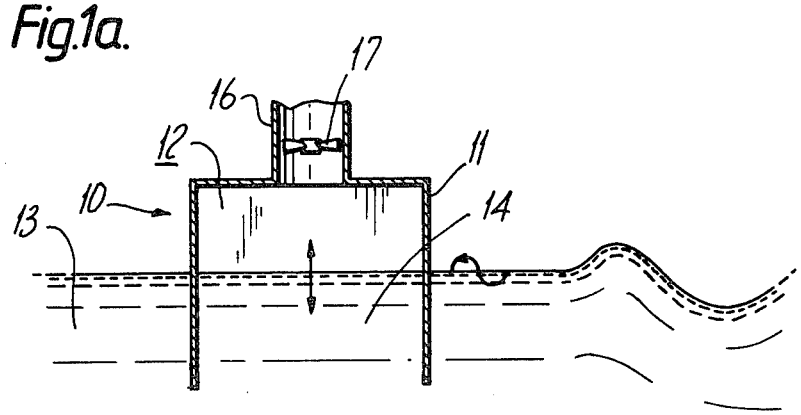
FIG. 1a shows a side, medial sectional view on the line Ia—Ia of FIG. 1.

Referring now to FIGS. 1 and 1a, a known device 10 is shown for extracting energy from waves, and comprises a body 11 defining a plurality of chambers 12 each of which is square or rectangular in plan and open at the bottom to a liquid 13 (e.g. the sea) in which the device 10 floats and has a column 14 of the liquid 13 therein. A duct 16 extends from the top of each chamber 12 and houses an air turbine 17. In operation, waves incident on the device 10 give rise to an oscillating excitation force 'Fe' on the liquid column 14 in each chamber 12, and this wave excitation force 'Fe' causes reciprocating motion of the liquid column 14 in the chamber 12. Air above the liquid column 4 is driven from the chamber 12 through the duct 16 and thus through the turbine 17 to exhaust into the atmosphere as the liquid column 14 rises in the chamber 12, air then being drawn back from the atmosphere through the duct 16 into the chamber 12 as the level of the liquid column 14 subsequently falls. The air flow through the turbine 17 may be bi-directional, or it may be made uni-directional through the use of suitable rectifying valves (not shown).

The operation of the device 10 is a resonant system having a natural frequency 'fo' given by:

$$fo = \frac{1}{2\eta} \sqrt{\frac{\text{buoyancy stiffness of liquid column 14}}{\text{mass of liquid column 14}}}$$

The maximum efficiency of energy extraction occurs at the natural frequency 'fo' when the aforesaid wave excitation force 'Fe' and the velocity 'z' of the liquid column 14 are in phase. At frequencies less than the natural frequency 'fo', the wave excitation force 'Fe' and the velocity 'z' of the liquid column 14 are out of phase, and the efficiency of energy extraction from the waves is less than the maximum.

Although the device 10 has been shown in FIG. 1 as having a plurality of chambers 12, in some applications a device having a single chamber 12 may be used.

Figure 2:
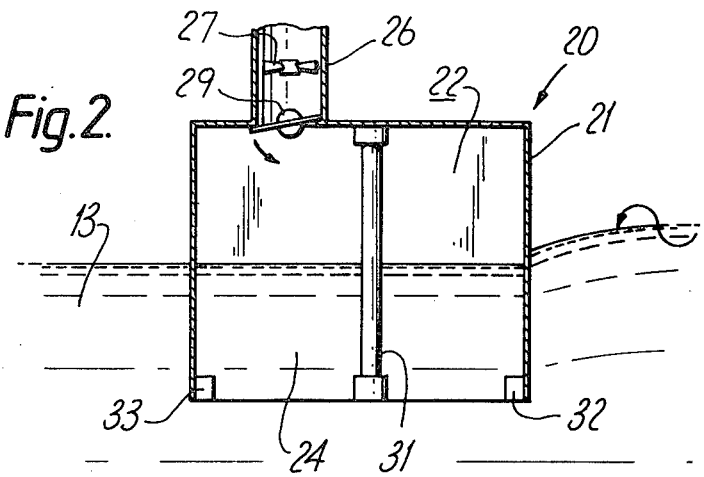
FIG. 2 shows a side, medial sectional view of a wave energy device similar to that of FIG. 1a but incorporating the invention.

Referring now to FIG. 2, a device 20 according to the invention is shown, and in many respects the device 20 is similar to the device 10 of FIG. 1 in having a body 21 defining at least one chamber 22 which is square or rectangular in plan and is open at the bottom thereof to a liquid 13 in which the device 20 floats. A column 24 of the liquid 13 is defined in the chamber 22, and a duct 26 above the chamber 22 houses an air turbine 27 driven by bi-directional air flow, an obturator means in the form of a rotatable valve 29 located at the junction of the duct 26 with the chamber 22 controlling air flow through the duct 26.

A wave gauge 31 extends downwardly from the top of the chamber 22, and pressure transducers 32, 33 are located at the bottom of the body at the front and at the rear thereof respectively.

In operation, the wave excitation force 'Fe' from the waves incoming towards the device 20 is sensed by the pressure transducers 32, 33 and the velocity 'z' of the liquid column 24 is sensed by the wavegauge 31.

If the velocity 'z' of the liquid column 24 is out of phase with the wave excitation force 'Fe', the valve 29 is closed when the liquid column 24 is at the top or at the bottom of its reciprocating motion so as to arrest the motion of the liquid column 24 and hold the liquid column 24 stationary. By predicting the behaviour of the wave excitation force, 'Fe', from its immediate past history as measured by the pressure transducers, 32, 33, the opening of valve 29 may be timed so that when the liquid column 24 resumes its reciprocating motion its velocity 'z' is in phase with the wave excitation force 'Fe', the velocity 'z' then peaking at the same time as the wave excitation force 'Fe'.

The liquid column 24 when released by opening of the valve 29 responds at approximately its natural frequency at a corresponding natural period To, and if the wave period is Tw, the period during which the valve 29 should be closed to hold the liquid column 24 stationary is $$\frac{Tw - To}{2}.$$

It will be seen that use of the invention enables the efficiency of extraction of energy from the waves by an oscillating water column device to be enhanced. Conversely, if an efficiency 'n' is acceptable which is lower than the maximum possible efficiency, use of the invention allows the selection of such a device with a higher natural frequency, and since the natural frequency thereof is inversely proportional to the square root of the size of the device, this can lead to a reduction in size of the device.

Figure 3:
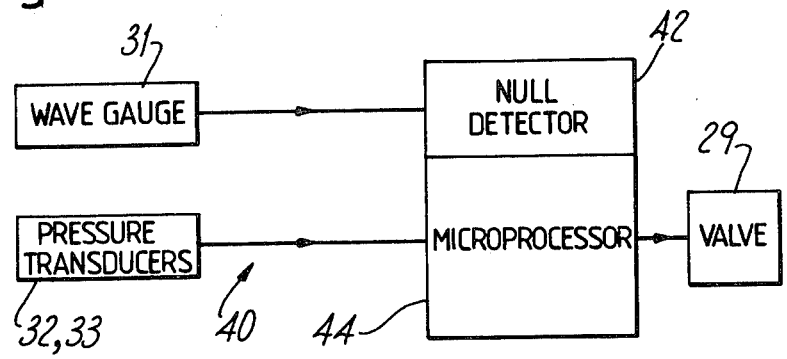
FIG. 3 shows a block schematic representation of a control circuit for the device of FIG. 2.

A circuit to control the operation of the device 20 is shown schematically in FIG. 3 to which reference is now made. In FIG. 3 a control circuit 40 is shown having a null detector 42 to which the wave gauge 31 is connected to feed data relating to the velocity 'z' of the liquid column 24. The null detector 42 is arranged to provide a signal to a microprocessor 44 to which the pressure transducers 32, 33 are also connected. The microprocessor 44 provides a signal to the valve 29 to close the valve 29 when a null velocity of the liquid column 24 (i.e. when the position of the liquid column 24 peaks) has been detected by the null detector 42 from the data supplied by the wave gauge 31. The microprocessor 44 makes a time domain prediction for optimum wave energy extraction based on the data relating to the liquid column 24 velocity 'z' provided by the wave gauge 31, and the data on the wave excitation force 'Fe' provided by averaging the pressures sensed by the pressure transducers 32, 33 The microprocessor 44 then provides a signal to open the valve 29 when the velocity 'z' of the liquid column 24 and the wave excitation force 'Fe' are in phase.

The wave gauge 31 may comprise probes (not shown) such as resistive, sonar or capacitive probes, or a float (not shown), or an optical gauge (not shown), for continuously monitoring the velocity of the liquid column 24.

Figure 2A:
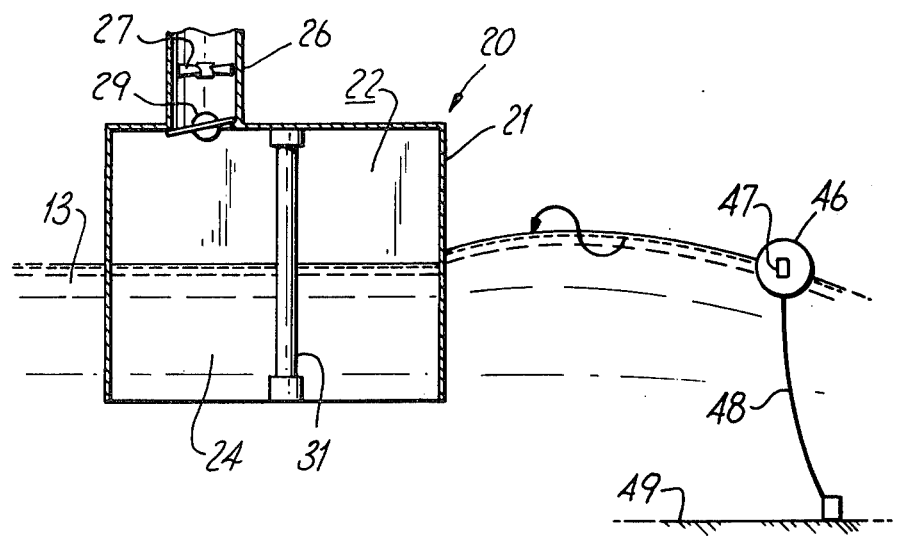
FIG. 2a shows a modification of the device of FIG. 2.

Conventional pressure transducers 32, 33 are used, but if desired the pressure transducers 32, 33 may be dispensed with and replaced, as shown in FIG. 2a by a wave rider buoy 46 incorporating an accelerometer 47 and moored by a line 48 to the sea bed 49 a known distance away from the device 20. The rider buoy 46 provides data from the accelerometer 47 on the vertical motion of the incoming waves at the rider buoy 46 and, as shown in FIG. 3a, supplies this data to the microprocessor 44 in a control circuit 40a to enable the aforesaid time domain prediction to be made for optimum wave energy extraction, the microprocessor 44 predicting the corresponding vertical motion of the waves at the forward portion of the device 20, and thus the phase of the wave excitation force 'Fe'.

Figure 3A:
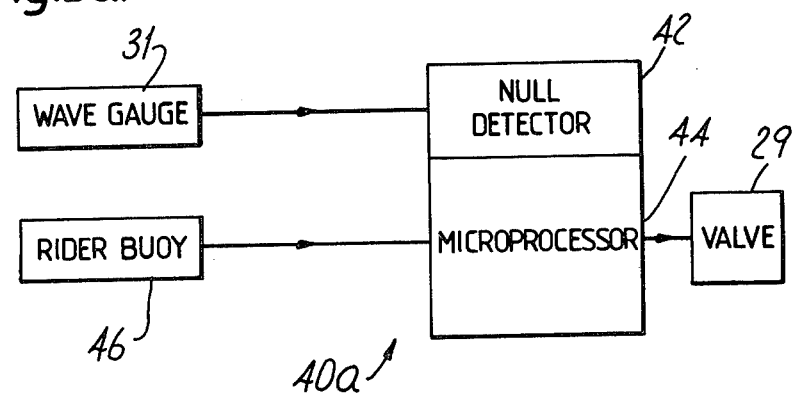
FIG. 3a shows a modification of the control circuit of FIG. 3.
Figure 4:
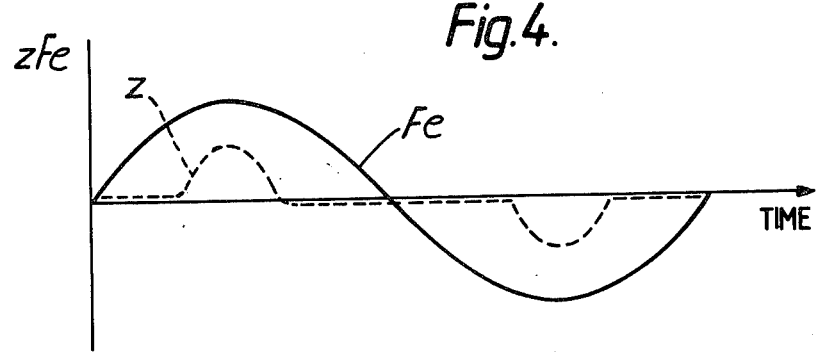

The values of the velocity 'z' of the liquid column 24 and the wave excitation force 'Fe' when they are kept in phase by the control circuits of FIG. 3 or 3a are shown plotted against time in FIG. 4 to which reference can be made.

The valve 29 may be electrically actuated, for example by an electric motor (not shown). However, if desired alternative valve actuating systems may be used.

One example of an alternative obturator means for holding the liquid column in the chamber stationary is shown in FIG. 5 to which reference is made. In FIG. 5, part of an oscillating water column device 50 is shown which is identical to the device 20 of FIG. 2 or 2a with the exception of a rectifying valve system 59 in place of the valve 29 of FIGS. 2, 2a, 3 and 3a. The rectifying valve system 59 is located in a duct 56 extending upwardly from a chamber 22 in the device in which a liquid column 24 describes reciprocating motion in response to a wave excitation force 'Fe'. The rectifying valve system 59 comprises, a housing 61 having a cylindrical bore 62 disposed normal to the longitudinal axis of the duct 56, and four vane valves 64, 65, 66, and 67 respectively which are disposed between the housing 61 and the duct 56 and such that valves 64 and 65 are below the bore 62 and valves 66 and 67 are above the bore 62. A turbine 57 arranged to be driven by uni-directional air flow is disposed in the bore 62.

The valving system 59 is controlled by the microprocessor 44 of FIG. 3 or 3a such that valves 64 and 65 are open when valves 65 and 66 are closed and vice versa, so as to arrange uni-directional air flow through the bore 62, or all the valves 64, 65, 66 and 67 are closed to arrest the motion of the liquid column 24 and hold the liquid column 24 stationary in the chamber 22. The direction of the air flow through the rectifying valving system 59 is shown by the continuous line 68 which indicates the air flow direction exhausting into the atmosphere as the liquid column 24 rises in the chamber 22 and the broken line 69 which indicates the air flow direction from the atmosphere when the liquid column 24 falls in the chamber 22.

Instead of the liquid column being held stationary indirectly by interrupting the air displaced by the liquid column, a valve system may be arranged to act directly on the liquid column as shown in FIG. 6 to which reference is made. In FIG. 6 a device 70 is shown which is similar in most respects to the device 20 of FIGS. 2 and 3, in having at least one chamber 22 in which a liquid column 24 is defined. However, the valve 29 of FIGS. 2 and 3, has been replaced in the device 70 by a multi-vane valve 79 located at the bottom of the chamber 22, pressure transducers 32, 33 being positioned below the valve 79.

In operation, the liquid column 24 in the device 70 reciprocates under the effect of the wave excitation force 'Fe' and can be held stationary when requested by the microprocessor 44 of FIG. 3 by closure of the valve 79.

Figure 7:
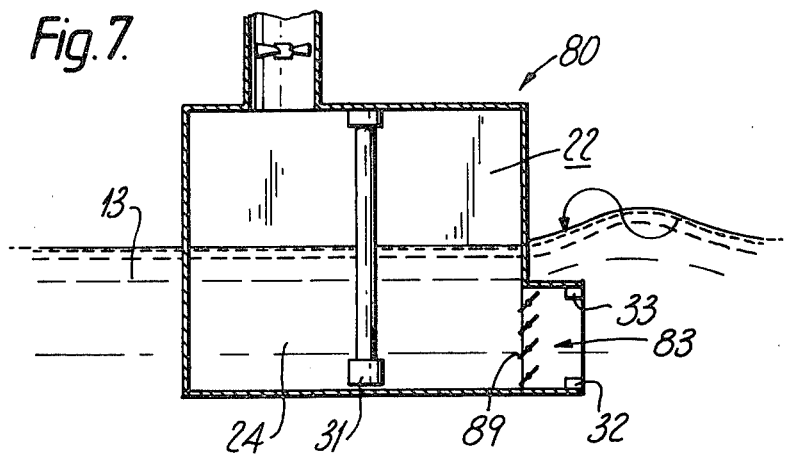
FIG. 7 shows a side, medial sectional view of a modification of the device of FIG. 6.

In FIG. 7, a device 80 is shown similar to the device 70 of FIG. 6 but having a forward side opening 83 to a chamber 22 in the device 80. A multi-vane valve 89 is located across the side opening 83 and is controlled by the microprocessor 44 of FIG. 3 so as to arrest the motion of a liquid column 24 and hold the liquid column 24 in the chamber 22 stationary when valve 89 is closed. Pressure transducers 32, 33 are positioned such that the pressure transducer 33 is at the top of the side opening 83, and the pressure transducer 32 is at the bottom of the side opening 83, the microprocessor 44 of FIG. 3 averaging the pressures recorded by the pressure transducers 32, 33 to provide the mean wave excitation force 'Fe' on the liquid column 24 at the side opening 83.

The valves 19 of FIGS. 2 and 2a, or the valve system 59 of FIG. 5, may also be incorporated in the devices 70, 80 of FIGS. 6 and 7 respectively so as to supplement the effect of the multi-vane valves 79, 89 respectively.

Figure 8:
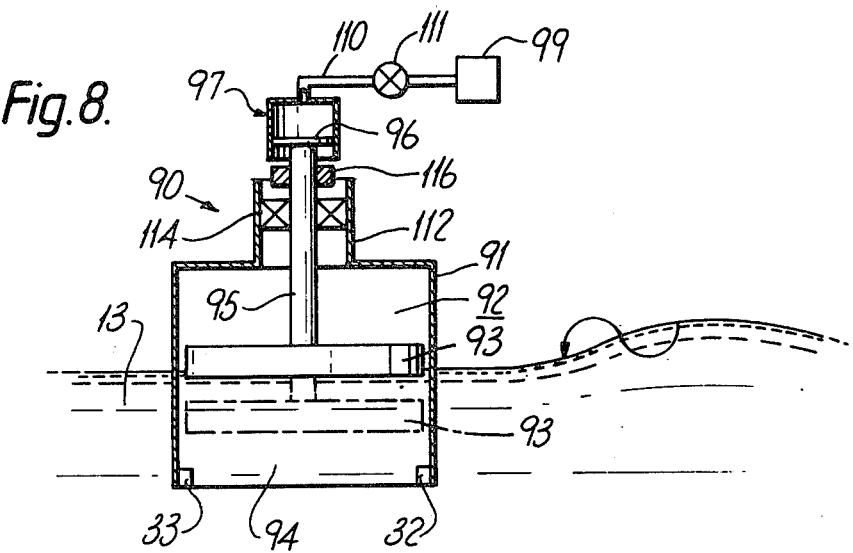
FIG. 8 shows a side, medial sectional view of another modification of the device of FIG. 2.
Figure 9:
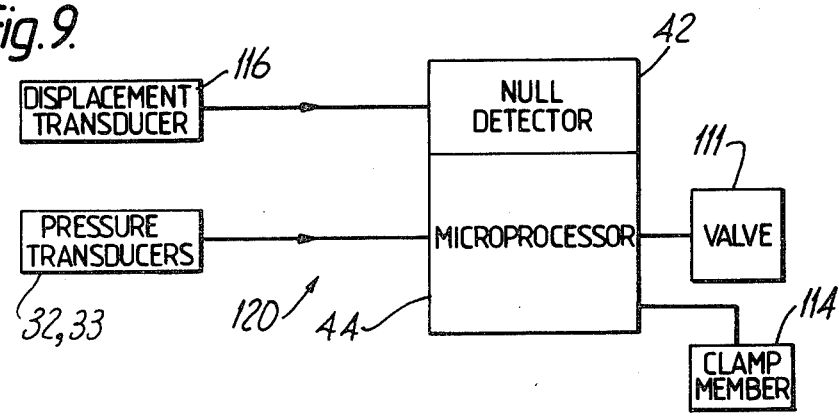
FIG. 9 shows a block schematic representation of a control circuit for the device of FIG. 8.

Although the invention has been described in relation to devices in which the reciprocating motion of a liquid column is used to drive air through a turbine to extract energy from the waves, work may be performed by the liquid column in an alternative manner as shown for example in FIG. 8 to which reference is made. In FIG. 8 a device 90 is shown which is similar to many respects to the device described in British patent specification No. 1,596,636 to which reference may be made. The device 90 comprises a body 91 defining at least one chamber 92 which is open at the bottom to a liquid 13 in which the device 90 floats and has a column 94 of the liquid 13 therein. A piston 93 which is a sliding fit in the chamber 92 floats on the surface of the liquid column 94 and has an upwardly extending piston rod 95. The piston rod 95 is connected at its upper end to a displacement member 96 of a hydraulic pump 97 which is connected to a hydraulic turbine 99 through a pipe 110 having an electrically operated stop valve 111 therein. An electric lamp member 114 secured inside a duct 112 fits around the piston rod 95 and when actuated grips the piston rod 95 to arrest its vertical movement. A displacement transducer 116 about the piston rod 95 provides data related to the velocity of the piston rod 95 and thus the velocity 'z' of the liquid column 94. Pressure transducers 32, 33 respectively are positioned at the bottom of the chamber 92 for providing data related to the wave excitation force 'Fe' in a similar manner to that described in relation to the device of FIG. 2. A control circuit 120 for the device 90 of FIG. 8 is shown in FIG. 9, and is similar to the control circuit 40 of FIG. 3, in that the displacement transducer 116 suplies data related to the velocity 'z' of the liquid column 94 to a null detector 42 which is connected to a microprocessor 44 to which the pressure transducers 32, 33 are also connected. The microprocessor 44 is arranged to operate either the valve 111 or the clamp member 114 to arrest the motion of the piston member 95 and hence of the liquid column 94.

In operation of the device 90, the piston 93 reciprocates with the motion of the liquid column 94 in response to waves and operates the hydraulic pump 97 which drives a hydraulic fluid through the turbine 99 to extract energy from the waves. In order to bring the velocity 'z' of the liquid column 94 in phase with the wave excitation force 'Fe', the clamp member 114 and/or the valve 111 is actuated by the microprocessor 44 to arrest the movement of the piston rod 95 and hence of the piston 93 and the liquid column 94, when the piston rod 95 is at a null velocity of its reciprocating motion. The clamp member 114 or the valve 111 is then actuated by the microprocessor 44 to release the piston member 95 when the velocity 'z' of the liquid column 94 and the wave excitation force 'Fe' are in phase.

Although the clamp member 114 and the valve 111 have both been shown by way of example for arresting the motion of the piston rod 95, one or the other may be dispensed with. In order to improve the sealing around the periphery of the piston 93 conventional low friction sealing means (not shown) may be used, and if desired resilient means (e.g. spring means) (not shown) may be disposed about the piston rod 95 to urge downward return motion of the piston 93.

If desired the piston 93 may be arranged to have a mass not substantially greater than the liquid 13 it displaces so that it is submerged in the liquid column 94. The liquid column 94 then resonates at a frequency corresponding to its full height in the chamber 92 as if the piston 93 were not there. This submerged position of the piston 93 is shown in broken line in FIG. 9.

It will be understood that if desired the transducers 32, 33 of FIGS. 6, 7 and 8 may be dispensed with and the rider buoy 46 of FIG. 2a used to provide data to the microprocessor 44 relating to the wave excitation force 'Fe'.

Although the invention has been described in relation to holding the liquid column stationary in a chamber of an oscillating liquid column wave energy device, in practice some slight movement of the liquid column might occur such that the velocity 'z' of the liquid column and the wave excitation force 'Fe' might still be slightly out of phase. Nonetheless, the efficiency of energy extraction from the waves would still be enhanced by use of the invention.

The extent to which the efficiency of the device may be enhanced by the invention depends inter alia on the underwater shape of the device. Thus for a device having a symmetrical underwater shape such as the devices of FIGS. 2, 2a, 5, 6 and 9, the maximum energy that can be extracted from the waves is approximately 0.5 of the energy of the incident waves, and for a device having an asymmetric underwater shape, such as the device of FIG. 7, the maximum energy extractable from the waves lies between 0.5 and 1.0 of the incident wave energy. Although in FIGS. 1, 2, 2a and 5 to 8, the waves have been shown as incoming in a particular direction with respect to the device, the invention may also be used where the waves are incoming from any particular direction.

It will be appreciated that the invention may be incorporated in other oscillating liquid column wave energy devices, for example the devices of U.S. Pat. Nos. 4,189,918, 4,139,984, 4,198,821, and British patent specification No. 1,593,983.

It will also be understood that the quantity of the liquid in the chamber need not form an upright column.

I claim:

1. A device for extracting energy from waves on a liquid, the device having a chamber with an opening for the flow of the liquid into and out of the chamber to provide a quantity of the liquid which is arranged to oscillate in the chamber from an oscillatory force produced by the effect of the waves, and means for extacting energy from said oscillations, wherein the improvement comprises, means for determining the phase of said oscillatory force, means for determining the phase of the velocity of the oscillating liquid in the chamber, and means for shifting the phase of said velocity so that said velocity is substantially in phase with the phase of said oscillatory force.

2. A device as claimed in claim 1, wherein the phase shifting means comprises means for arresting the oscillations of the quantity of liquid at about a null velocity of the oscillating movement thereof, until the phase of said velocity and the phase of said force are substantially in phase.

3. A device as claimed in claim 2, wherein the arresting means includes obturator means.

4. A device as claimed in claim 3, wherein the obturator means is at or near the opening.

5. A device as claimed in claim 2, wherein the energy extracting means includes a displacement member arranged to be displaced by the oscillations of the quantity of liquid, and the arresting means includes means for arresting the displacement of the displacement member.

6. A device as claimed in claim 2, wherein the energy extracting means comprises pneumatic motor or turbine means through which a gas is caused to flow by the oscillations of the liquid, and the arresting means includes, means for obturating the flow of the gas.

7. A device as claimed in claim 6, wherein the gas obturating means comprises rectifying valve means for producing uni-directional flow of the gas therethrough.

8. A device as claimed in claim 1, wherein the means for determining the phase of the oscillatory force includes, transducer means for sensing said force.

9. A device as claimed in claims 8, wherein the transducer means are disposed at or near the opening.

10. A device as claimed in claim 1, wherein the means for determining the phase of the oscillatory force includes, means for sensing the vertical motion of the waves at a selected distance from the chamber.

11. A device as claimed in claim 1, wherein the means for determining the phase of the velocity of the oscillating liquid includes, wave gauge means extending downwardly in the chamber for monitoring the velocity of the liquid in the chamber.

12. A device as claimed in claim 5, wherein the means for determining the phase of the velocity of the oscillating liquid includes, means for sensing the displacement of the displacement member.

13. A device as claimed in claim 1, including means for detecting a null velocity of the oscillating liquid from signals provided by the velocity phase determining means.

14. A device as claimed in claim 1, wherein the device is provided with an asymmetric underwater shape such as to enhance the energy extractable by the device from the waves.

15. A device for extracting energy from waves on a liquid and comprising, a body defining a chamber therein, the chamber having an opening at the lower end of a side wall of the chamber, the opening being arranged to be positioned in use facing waves incoming towards the body and through which opening the liquid can flow into and out of the chamber so as to provide a quantity of the liquid which is arranged to oscillate in the chamber from an oscillatory force produced by the effect of the waves; and means for extracting energy from said oscillations, wherein the improvement comprises, (a) transducer means at the opening for monitoring the oscillatory force;

(b) valve means at the opening and operable so that when closed the valve means arrests the oscillations of the liquid in the chamber;

(c) wave gauge means extending downwardly in the chamber for monitoring the velocity of the oscillating liquid;

(d) means for detecting a null velocity of the oscillating liquid in the chamber from signals provided by the wave gauge means; and (e) microprocessor means to which signals from the null velocity means and the transducer means are arranged to be sent, the microprocessor means being adapted to compare the phases of the oscillatory force and of the velocity of the oscillating liquid, and being arranged to control the valve means, whereby the oscillatory force phase and the oscillating liquid velocity phase may be brought substantially into phase by closure of the valve means so as to shift the phase of the oscillating liquid velocity until it is in phase with the oscillatory force.

16. A device for extracting energy from waves on a liquid and comprising, (a) a body defining a chamber therein, the chamber having an opening at the bottom thereof, through which opening the liquid can flow into and out of the chamber so as to provide a quantity of the liquid which is arranged to oscillate in the chamber from an oscillatory force produced by the effect of the waves;

(b) a piston member disposed in the chamber so as to be displaced by the oscillating liquid in the chamber, the piston having a mass not substantially greater than the liquid displaced thereby so as to be submerged in the oscillating liquid;

(c) a piston rod extending upwardly at one end from the piston member;

(d) a displacement member at the other end of the piston rod;

(e) a hydraulic cylinder in which the displacement member locates so as to be displaced therein by displacement of the piston rod;

(f) a releasable clamping means disposed about the piston rod, the clamping means being operable to clamp the piston rod so as to arrest the displacement thereof;

(g) a displacement transducer means adjacent to the piston rod for monitoring the displacement and thereby the velocity thereof;

(h) means for detecting a null velocity of the piston rod from signals provided by the displacement transducer means;
(i) pressure transducer means at the opening for monitoring the oscillatory force;
(j) microprocessor means to which signals from the null velocity means and the pressure transducer means are arranged to be sent, the microprocessor means being adapted to compare the phase of the oscillatory force with the phase of the velocity of the piston rod, and being arranged to control the clamping means, whereby the phase of the oscillatory force and the phase of the oscillating liquid velocity may be brought substantially into phase, by actuation of the clamping means to clamp the piston rod, and thereby the piston member, so as to shift the phase of the oscillating liquid velocity until it is in phase with the oscillatory force.

17. A method of extracting energy from waves on a liquid from the oscillations of a quantity of the liquid in a chamber under the effect of an oscillatory force produced by the effect of the waves, the method including sensing the phase of said force and of the velocity of said oscillations of the quantity of liquid, and shifting the phase of said velocity so that said velocity is substantially in phase with said force.

18. A method as claimed in claim 17, wherein said phase shifting is arranged by arresting the oscillations of the quantity of liquid at about a null velocity of the oscillatory movement thereof.

* * * * *